United States Patent

Yanagita et al.

[11] Patent Number: 5,447,653
[45] Date of Patent: Sep. 5, 1995

[54] METHOD FOR THE PRODUCTION OF WATER PURIFYING SUBSTANCES

[75] Inventors: Tomotaka Yanagita; Yaozong Jiang, both of Tokyo, Japan

[73] Assignee: Createrra Inc., Tokyo, Japan

[21] Appl. No.: 202,062

[22] Filed: Feb. 25, 1994

[30] Foreign Application Priority Data

Feb. 26, 1993 [JP] Japan .................... 5-037739

[51] Int. Cl.$^6$ .............................. C02F 1/42
[52] U.S. Cl. .................... 252/179; 252/175; 252/80; 501/80
[58] Field of Search ............ 501/80; 252/175, 179, 252/80

[56] References Cited

U.S. PATENT DOCUMENTS 4,724,078  2/1988  Auriol et al. ............. 501/80
4,758,538  7/1988  Satoh et al. ............. 501/80
4,965,230 10/1990  Nakajima et al. ......... 501/80

FOREIGN PATENT DOCUMENTS 68445  3/1991  Japan .
68489  3/1991  Japan .

OTHER PUBLICATIONS

Patent Abstracts of Japan, vol. 15, No. 227 (C-0839); Jun. 10, 1991 of JP-A-30 068 445 (Mar. 25, 1991).
Database WPI, AN 92-172416 of JP-A-4110 035 (Apr. 10, 1992).
Database WPI, AN 88-067440 of JP-A-63 021 113 (Jan. 28, 1988).
Patent Abstracts of Japan, vol. 15, No. 289 (C-0852); Jul. 23, 1991 of JP-A-31 001 834 (Apr. 26, 1991).

*Primary Examiner*—Prince Willis, Jr.
*Assistant Examiner*—James M. Silbermann
*Attorney, Agent, or Firm*—Wenderoth, Lind & Ponack

[57] ABSTRACT

Water purifying substances produced by mixing raw material soil containing allophane expressed by:

$$nSiO_2 \cdot Al_2O_3 \cdot mH_2O$$

where, n is a number within the range of 1.3 to 2, and m is a number within the range of 2.5 to 3 at the maximum larger than 0, with water, and sintering a mixture thus obtained at 200° C. to 700° C., consequently to form porous sintered particles having a function of absorbing and fixing phosphoric acid. By scattering the water purifying substances around a lake, marsh or other body of water, phosphoric acid in sludge accumulated in the lake and so on can be effectively captured. The purifying effect of the water purifying substance can be improved by adding polyaluminum chloride and/or ferrous sulfate to the raw material soil.

3 Claims, No Drawings

METHOD FOR THE PRODUCTION OF WATER PURIFYING SUBSTANCES

BACKGROUND OF THE INVENTION

1. Field of the Invention

This invention relates to a water purifying substance having a high ability to fix phosphoric acid and a method for producing the same, and more particularly to a water purifying substance capable of decreasing the phosphoric acid content contained in sludge accumulated on the bottom of a sewer, lake or other body of water.

2. Description of the Prior Art

Recently, the nitrogen and phosphorous content of wastes or scraps is increasing, thus resulting in an environmental problem from the viewpoint that the wastes containing such nutritious matters intended for the land are dumped into a river, lake, marsh or other body of water. In a sense, the environment is nourished by such wastes and scraps fortified with plenty of nutritious salts such as nitrogen and phosphorous, which flow into the sea, river, lake or marsh via the drainage basins. Thus, the wastes are of high nutritive value primarily for plant plankton and are accumulated on the bottom of the body of water.

With this increase in the nourishment of the environmental system, however, harmful plant plankton causing such problems as water-bloom and red tide are bred on a massive scale, thus coloring the water of the lake or other body of water green or brown. The environmental pollution often causes damage to the marine products industry, fish-raising industry and so forth, and causes anxiety about the safety of the water.

There are thought to be two routes by which phosphoric acid serving as a nutrient for microorganisms reaches an environmental system such as a lake and so on. These routes are as follows:

(1) Waste water fortified with phosphoric acid that flows into the lake or the like.

(2) Phosphoric acid held in sludge that accumulates on the lake bottom.

These routes have been blocked by the following methods.

(A) To solve the aforenoted problem (a), there may be adopted a method of absorbing the pollutant in question by use of an adhering biological membrane such as used in a common liquid-waste treatment; an absorbent such as activated charcoal capable of absorbing even small quantities of organic and stinking substances; or a modern reaction device of an ozone-oxidation type which methods are capable of cleaning up city waste water to a high degree.

(B) A method for solving the aforenoted problem (b) has been practiced by scattering sand all over the body of water to confine the sludge.

However, it has so far been difficult to completely cut off the route of phosphoric acid flowing into the lake or marsh and to prevent the wastes from being fortified by the reasons mentioned below.

To be more specific, the former method (A) for solving the first problem (a) by use of various absorbing means is practiced by connecting into the public sewage system all of the pollution sources, including all sources of domestic waste water from domestic drainage and all sources of industrial liquid waste flowing out from even small factories; purifying the waste water by completely removing the phosphoric acid from the waste water; and then discharging the purified waste water into the lake, river or other body of water. This method is disadvantageous in that it entails too much labor, expense and time to be practicable.

Although the aforesaid method may possibly become practical some day in the future, the technique and facilities for purifying waste water will be accompanied great planning and managing difficulties.

According to the latter method (B) for improving the environment, the polluted sludge in the lake or other water body may be completely covered up with sand, but this is by no means a fundamental solution of the problem because the polluted sludge does not cease to exist.

Incidentally, the self-purification of rivers, land, lakes and marshes has been known since early times. For instance, land has a power to organically decompose substances due to the presence of soil microbes and it contains clay particles essentially possessing the prominent ability to absorb phosphorous.

Therefore, it is desirable to make good use of the purifying abilities of nature without exclusively depending on a wastewater treatment system.

OBJECT OF THE INVENTION

The present invention was made to remedy the shortcoming of the conventional waste purifying system and has an object to provide a water purifying substance having excellent ability to fix phosphoric acid contained in the nutritious sludge of a lake, marsh and other body of water so as to improve the quality of the water. Further, the invention provides a method for producing that water purifying substance.

SUMMARY OF THE INVENTION

The inventors have made a thorough study of how to effectively utilize the self-purification effect of soil. They have found that sintered particles produced by sintering soil containing at least one of silicon, aluminum and iron compounds and the chemical compositions thereof at a specific temperature have an unexpectedly excellent ability of fixing phosphoric acid, and also of decreasing the thickness of the nutrition soil layer accumulated on the bottom of a lake or the like.

According to the present invention, there is provided a water purifying substance made porous by sintering compounds containing at least one of oxides of silicon, aluminum and iron.

A method according to the present invention comprises mixing soil containing at least one of silicon, aluminum and iron compounds and the chemical compositions thereof with water, and sintering the mixture thus obtained at 200° C. to 700° C. to obtain porous sintered particles having a water purifying function.

The water purifying substance according to this invention is made granular. However, the shape, grain size and unit surface area of the granular substance are by no means limitative and may be determined in accordance with the purpose and condition for which the substance is used.

It is desirable to use the water purifying substance in a particle size of 1 mm to 20 mm, preferably, 2 mm to 5 mm, and having a porosity of 10% to 40%, preferably, 20% to 40%.

Although the porous sintered substance contains at least one oxide of silicon, aluminum and iron or compounds thereof, the component ratio of the oxides and their compounds depends on the raw material constituting the sintered substance. The sintered substance may comprise an oxide other than the aforenoted elements or compounds other than a sulfate oxide.

Other and further objects of this invention will become obvious upon an understanding of the embodiments about to be described or will be indicated in the appended claims, and various advantages not referred to herein will occur to one skilled in the art upon employment of the invention in practice.

DESCRIPTION OF THE PREFERRED EMBODIMENTS

The water purifying substance according to the present invention consists of porous sintered particles containing at least one of silicon, aluminum and iron compounds and the chemical compositions thereof.

The method for producing the water purifying substance according to this invention will be described hereinafter.

First, soil containing at least one of silicon, aluminum and iron compounds, and the chemical compositions thereof, is mixed with water. The term soil within the meaning of this description shall be not only the substances possessing the silicon, aluminum and iron compounds and the chemical compositions thereof by nature, but also the substances artificially mixed with the silicon, aluminum and iron compounds and the chemical compositions thereof.

The silicon compounds contained in the soil comprise silicon dioxide. As the aluminum compounds, there may be enumerated polyaluminum chloride, aluminum sulfate, and aluminum hydroxide. As the iron compounds, ferrous sulfate can be used in the soil. As the chemical compositions thereof, allophane expressed by the following chemical formula (1) may be enumerated.

$$nSiO_2.Al_2O_3.mH_2O \qquad (1)$$

(In the formula, n is a number within the range of 1.3 to 2, and m is a number within the range of 2.5 to 3 at the maximum larger than 0.) The chemical compositions may comprise clay containing $nSiO_2.Al_2O_3.mH_2O$ out of the ranges of n and m specified before. To be specific, the soil used in this invention may contain these compounds singly or in combination. As a typical example of the combined compounds, there can be enumerated a mixture of the allophane given by the aforementioned chemical formula and polyaluminum chloride, a mixture of at least two of ferrous sulfate, aluminum sulfate land aluminum hydroxide, and a mixture of ferrous sulfate and aluminum sulfate. The term "chemical compositions" herein should be interpreted to signify a compound obtained by arbitrarily combining a silicon compound, aluminum compound, iron compound and their salt.

As examples of the soil containing the silicon compound, aluminum compound, iron compound and/or their compositions, there are mentioned volcanic ash soil (loam soil extracted in the Kanto district of Japan, particularly, Musashino or Tachikawa area) and clay. In place of these, the silicon, aluminum and iron compounds and the chemical compositions thereof can be used singly. In the case of singly using these compounds, it is desirable to add volcanic ash soil, clay, aluminum sulfate, calcium hydroxide and/or calcium oxide thereto.

Although the contents of the silicon, aluminum, iron compounds and/or the chemical compositions thereof in the soil are not specifically limited, it may be desirably determined to 5% by weight or more, preferably 20% by weight or more.

The mixing ratio of the soil and water may be determined in accordance with the kind of the soil and the water content. The mixture is originally prepared by adding water of 30 to 50 parts by weight to bone dry soil.

Next, the mixture of soil and water is sintered in the air. The sintering temperature is 200° C. to 700° C., preferably, 400° C. to 500° C. The porous sintered substances formed by sintering the mixture at a temperature out of this range are unsatisfactory in purifying properties and stability in water (susceptible to decomposition resulting in suspension in water). Although the sintering temperature can be substantially determined in accordance with the kind of the soil used as raw materials, volcanic ash soil may preferably be sintered at 200° C. to 600° C., and a mixture containing other materials may preferably be sintered at 200° C. to 700° C. The sintering time may be determined in accordance with the kind and amount of the raw materials to be sintered.

The granular and porous sintered substances thus obtained can be used as a water purifying agent as it is. Addition, the sintered substances may be used in the state contained in a suitable container or placed on a carrier as needed.

The water purifying substance according to this invention has an excellent ability to fix phosphoric acid and therefore is suitable for absorbing and removing the phosphoric acid in water or soil. Only by scattering the water purifying substances of this invention around a lake or marsh in which sludge fortified with nutritious waste materials is accumulated, can the phosphoric acid be effectively absorbed by the water purifying substances. Thus, the phosphoric acid remaining in the sludge disappears gradually from the soil or sludge. Also phosphoric acid contained in flowing water can be removed by the water purifying substances of the invention and prevented from being accumulated in the sludge. This fact means that the artificial removal of phosphoric acid contained in the sludge can be readily effected by using the native self-purification effect without using any expensive wastewater treatment system. Furthermore, the water purifying substance of the invention can be used as a filtration material. The purifying ability of a water purifying device can be remarkably improved by using the water purifying substances of the invention as the filtration material.

The water purifying substances according to the present invention has the ability to absorb and fix arsenic, too.

In addition, the water purifying substance of this invention can be used as a coagulating agent. By scattering the water purifying substances of the invention around a lake or other water body in which sludge fortified with nutritious waste materials is accumulated, suspended matters can be coagulated and precipitated. As a result, the phosphoric acid in the sludge is prevented from diffusing in the water. The water purifying substance of this invention which is produced in the form of sintered particles can be formed into a block. The block-formed sintered particles may be spread over the bottom of the river or other watering places so as to purify the water.

The coagulating agent produced by sintering a mixture of allophane and polyaluminum chloride, which is expressed by the aforenoted chemical formula (1), is more excellent in coagulating ability. This effect results from the native coagulating function of polyaluminum chloride and is heightened by the synergistic effect of the sintered substances having the ability to fix phosphoric acid and the polyaluminum chloride essentially having the ability of coagulating the phosphoric acid. Accordingly, the quality of any kind of water can be improved.

As stated above, the water purifying substance of this invention serves as an absorbent or coagulant for phosphoric acid or arsenic and may be used together with known absorbent such as activated charcoal and zeolite, or known coagulant such as iron chloride, aluminum sulfate and polyacrylamide.

The water purifying substances and the method for producing the substances according to this invention will be described in detail hereinafter with reference to the embodiments practicing the invention, but the following embodiments should not be understood as limitative.

EMBODIMENT 1

Production Of Water Purifying Substance Having High Ability To Fix Phosphoric Acid A principal raw material was obtained by adding 0.7 kg of water to 5 kg of volcanic ash soil containing allophane (expressed by the foregoing formula (1): This is the same with the following description), and mixing the mixture well. The raw material thus obtained was squeezed out through pores of 3.5 mm in diameter and sintered in an electric furnace at 500° C. for 15 minutes to form porous sintered particles (2 to 4 mm in average diameter and 25% to 30% in porosity). Then, the sintered particles were scattered in water to study the adaptation to water. The study revealed that the sintered particles were not decomposed nor suspended in water at all.

EMBODIMENT 2

Production Of Water Substance Having High Ability To Fix Phosphoric Acid With Polyaluminum Chloride A principal raw material was obtained by adding polyaluminum chloride of 4% by dry weight to 5 kg of volcanic ash soil containing 0.7 kg of water and allophane and mixing the mixture sufficiently. The raw material thus obtained was squeezed out through pores of 3.5 mm in diameter and sintered in an electric furnace at 500° C. for 5 minutes to form porous sintered particles (2 to 4 mm in average diameter and 25% to 30% in porosity). Then, the sintered particles were scattered in water to study the adaptation to water. The study revealed that the sintered particles were not decomposed nor suspended in water at all.

EMBODIMENT 3

Production Of Water Purifying Substance Having High Ability To Fix Phosphoric Acid With Ferrous Sulfate A principal raw material was obtained by adding ferrous sulfate of 1% by dry weight relative to 5 kg of volcanic ash soil containing 0.7 kg of water and allophane and mixing the mixture sufficiently. The raw material thus obtained was squeezed out through pores of 3.5 mm in diameter and sintered in an electric furnace at 500° C. for 15 minutes to form porous sintered particles (2 to 4 mm in average diameter and 25% to 30% in porosity). Then, the sintered particles were scattered in water to study the adaptation to water. The study revealed that the sintered particles were not decomposed nor suspended in water at all.

COMPARATIVE STUDY 1

Evaluation Of Water Purifying Substance Having Ability To Fix Phosphoric Acid

The evaluation of the water purifying substance of this invention was made by adding 15 g of porous sintered particles produced in the foregoing Embodiment 1 to 1 liter of water specimens having the phosphoric acid concentrations of 10, 20 and 50 ppm, respectively. Then, the water purifying substances of this invention were scattered as experimental samples in the water specimens and observed successively to evaluate its ability to fix the phosphoric acid. The experimental samples EX-1, EX-2 and EX-3 of the water purifying substances of this invention were examined in the water specimens having the phosphoric acid concentrations of 10, 20 and 50 ppm, respectively. Grains of sand used as comparative samples were sprinkled in the water under the same conditions to evaluate the phosphoric acid fixing ability thereof in the same manner. The comparative samples CS-1, CS-2 and CS-3 were sprinkled in the water having the phosphoric acid concentrations of 10, 20 and 50 ppm, respectively. The experimental results are shown in Table 1 below.

TABLE 1

| | Phosphoric Acid Concentration ($P_2O_5$ ppm) in Water Time Lapse | | | | | | | |
|---|---|---|---|---|---|---|---|---|
| | 0 hr | 4 hrs | 8 hrs | 1 day | 2 days | 7 days | 14 days | 28 days |
| EX-1 | 10.00 | 8.60 | 7.10 | 3.30 | 2.25 | 1.08 | 0.58 | 0.22 |
| EX-2 | 20.00 | 13.60 | 11.50 | 7.20 | 4.35 | 2.10 | 0.89 | 0.23 |
| EX-3 | 50.00 | 38.26 | 30.30 | 18.80 | 10.65 | 5.00 | 2.30 | 0.31 |
| CS-1 | 10.00 | 9.95 | 9.93 | 9.95 | 9.90 | 9.88 | 9.85 | 9.82 |
| CS-2 | 20.00 | 20.10 | 19.95 | 19.94 | 19.91 | 19.89 | 19.85 | 19.84 |
| CS-3 | 50.00 | 50.05 | 49.97 | 49.97 | 49.92 | 49.90 | 49.87 | 49.83 |

As is evident from the experimental results shown in Table 1, the water purifying substances used as the experiment samples EX-1 to Ex-3 could bring about the effect to reduce the concentration of phosphoric acid in water to 0.22 to 0.31 ppm. On the other hand, the grains of sand used as the comparative samples CS-1 to CS-3 do not very much change the concentration of phosphoric acid in water even after a lapse of 28 days. Accordingly, it is found that the water purifying substances of this invention excels in the ability to fix phosphoric acid.

COMPARATIVE STUDY 2

Evaluation Of Water Purifying Substance Having Ability To Fix Phosphoric Acid In Sludge In this comparative study, a phosphoric acid solution was added to 200 ml to prepare sludge samples having the respective phosphoric acid concentrations of 3.43, 15.40 and 48.25 ppm. Then, 15 g of water purifying substance produced in the form of porous sintered particles in the foregoing Embodiment 1 was scattered in 1 liter of sludge samples containing the phosphoric acid. Each time a prescribed time passed, the phosphoric acid fixing ability of the water purifying substances was observed and evaluated. In this study, the water purifying substances scattered in the sludge samples having the phosphoric acid concentrations of 3.43, 15.40 and 48.25 ppm are respectively designated as experimental samples EX-4, EX-5 and EX- 6.

Comparative samples CS-4, CS-5 and Cs-6 were prepared by adding phosphoric acid to 200 ml of sludge so as to have the phosphoric acid concentrations of 3.43, 15.40 and 48.25 ppm, respectively. The results of this experiment is shown in Table 2 below.

TABLE 2

| | Phosphoric Acid Concentration ($P_2O_5$ ppm) in Water Time Lapse | | | | | | |
|---|---|---|---|---|---|---|---|
| | 0 hr | 4 hrs | 8 hrs | 1 day | 2 days | 7 days | 14 days | 28 days |
| EX-4 | 3.42 | 3.43 | 3.36 | 1.73 | 1.06 | 0.98 | 0.71 | 0.18 |
| EX-5 | 15.35 | 11.31 | 9.79 | 6.80 | 3.91 | 2.26 | 0.84 | 0.35 |
| EX-6 | 48.21 | 38.25 | 31.26 | 21.93 | 12.54 | 7.10 | 0.29 | 0.10 |
| CS-4 | 3.43 | 3.47 | 3.41 | 3.33 | 3.22 | 3.25 | 3.27 | 3.10 |
| CS-5 | 15.40 | 15.40 | 15.38 | 15.41 | 15.38 | 15.40 | 15.35 | 15.32 |
| CS-6 | 48.25 | 48.30 | 48.35 | 48.25 | 48.20 | 48.15 | 48.20 | 48.10 |

As is evident from the experimental results shown in Table 2, the water purifying substances used as the experiment samples EX-1 to EX-3 could bring about the effect to reduce the concentration of phosphoric acid in water to 0.10 to 0.35 ppm. Accordingly, it is found that the water purifying substances of this invention produced in the aforenoted Embodiment 2 excels in the ability to fix phosphoric acid even when the phosphoric acid gets mixed in sludge.

COMPARATIVE STUDY 3

Evaluation Of Coagulating Effect of Water Purifying Substance

In this comparative study, water or a phosphoric acid solution was added to 200 ml to prepare sludge samples having the phosphoric acid concentrations of 0, 10, 20 and 50 ppm, respectively. Then, 15 g of water purifying substance produced in the form of porous sintered particles in Embodiment 1 described above was scattered in 1 liter of phosphoric acid solution mixed with sludge. Each time a prescribed time passed, the water permeability of the water purifying substances was evaluated. In this study, the water purifying substances scattered in the solution containing no phosphoric acid is designated as an experimental sample EX-7, and those having the respective phosphoric acid concentrations of 10, 20 and 50 ppm are designated as experimental samples EX-8, EX-9 and EX-10.

Comparative samples CS-7 and Cs-8 were prepared from solutions having the phosphoric acid concentrations of 0 and 10 ppm, respectively and evaluated in their water permeability each time a prescribed time passed. The results of this experiment is shown in Table 3 below.

TABLE 3

| | Water Permeability (%) Time Lapse | | | | | | |
|---|---|---|---|---|---|---|---|
| | 0 hr | 4 hrs | 8 hrs | 1 day | 2 days | 7 days | 14 days |
| EX-7 | 57.1 | 62.0 | 77.0 | 71.9 | 85.8 | 97.8 | 98.6 |
| EX-8 | 69.1 | 72.4 | 85.6 | 83.5 | 95.7 | 98.2 | 98.9 |
| EX-9 | 70.8 | 74.6 | 85.6 | 88.1 | 97.7 | 98.0 | 98.4 |
| EX-10 | 68.8 | 74.3 | 82.9 | 88.2 | 97.7 | 97.8 | 98.4 |
| CS-7 | 57.1 | 59.5 | 67.3 | 70.5 | 82.0 | 95.5 | 97.1 |
| CS-8 | 71.2 | 78.9 | 80.6 | 83.5 | 94.5 | 98.3 | 98.5 |

From the results shown in Table 3, it is evident that the water purifying substances produced in Embodiments 1-3 noted above have an effect of coagulating phosphoric acid too, so that the clarity of the water can be remarkably increased, and in particular, the water purifying substance produced in Embodiment 2 is most excellent in coagulation.

COMPARATIVE STUDY 4

Evaluation Of Phosphoric: Acid Fixing Ability of Water Purifying Substance

The comparative study was carried out by scattering 15 g of water purifying substance consisting of the porous sintered particles containing polyaluminum chloride, which is produced in Embodiment 2 noted above, in 1 liter of water prepared to have the phosphoric acid concentration of 50 ppm. Each time a prescribed time passed, the phosphoric acid fixing ability of the water purifying substances of this invention was evaluated. The water purifying substance used in this study is designated as an experimental sample EX-11.

An comparative sample CS-9 was evaluated without use of the water purifying substance of this invention each time a prescribed time passed. The result of this experiment is shown in Table 4.

TABLE 4

| | Phosphoric Acid Concentration ($P_2O_5$ ppm) in Water Time Lapse | | | | | | |
|---|---|---|---|---|---|---|---|
| | 0 hr | 4 hrs | 8 hrs | 1 day | 2 days | 7 days | 14 days | 28 days |
| EX-11 | 50.00 | 36.40 | 27.85 | 15.50 | 9.31 | 3.55 | 1.95 | 0.20 |
| CS-9 | 50.00 | 50.05 | 49.97 | 49.95 | 49.92 | 49.90 | 49.87 | 49.83 |

As is evident from the experimental results shown in Table 4, the water purifying substance used as the experiment sample EX-11 containing polyaluminum chloride could bring about the effect to reduce the concentration of phosphoric acid in water to 0.02 ppm. Accordingly, it is found that the water purifying substances of this invention used in the aforenoted Embodiment 2 has more excellent ability to fix phosphoric acid in comparison with the polyaluminum chloride-free water purifying substance in the aforenoted Embodiment 1.

COMPARATIVE STUDY 5

Evaluation Of Phosphoric Acid Fixing Ability of Water Purifying Substance In Sludge In this comparative study, a phosphoric acid solution was added to 200 ml to prepare a sludge sample having the phosphoric acid concentration of 51.10 ppm. Then, 15 g of water purifying substance polyaluminum chloride produced in the form of porous sintered particles in Embodiment 2 noted above was scattered in 1 liter of phosphoric acid solution mixed with sludge. Each time a prescribed time passed, the phosphoric acid fixing ability of the water purifying substance was evaluated. In this study, the water purifying substance scattered in the solution is designated as an experimental sample EX-12.

An comparative sample CS-10 was prepared from solution having the phosphoric acid concentration of 51.40 ppm and evaluated in its phosphoric acid fixing ability each time a prescribed time passed. The results of this experiment is shown in Table 5 below.

TABLE 5

| | Phosphoric Acid Concentration ($P_2O_5$ ppm) in Water Time Lapse | | | | | | | |
|---|---|---|---|---|---|---|---|---|
| | 0 hr | 4 hrs | 1 day | 2 days | 5 days | 12 days | 19 days | 33 days |
| EX-12 | 51.10 | 47.10 | 39.25 | 27.58 | 17.30 | 15.45 | 7.85 | 0.25 |
| CS-10 | 51.40 | 51.10 | 50.87 | 50.98 | 50.97 | 50.83 | 50.87 | 50.89 |

From the results shown in Table 5, it is evident that by using the water purifying substance, the phosphoric acid concentration in water could be remarkably reduced to 0.25 ppm. Therefore, the water purifying substance containing polyaluminum chloride, which is produced in Embodiment 2 noted above, shows excellent ability to fix phosphoric acid in sludge.

COMPARATIVE STUDY 6

Evaluation Of Phosphoric Acid Fixing Ability of Water Purifying Substance With Ferrous Sulfate A phosphoric acid solution used in this comparative study was added to 200 ml of sludge so as to have the phosphoric acid concentration of 51.10 ppm. Then, 15 g of water purifying substance with ferrous sulfate as produced in Embodiment 3 in the form of porous sintered particles, was scattered in the phosphoric acid solution. Each time a prescribed time passed, the phosphoric acid fixing ability of the water purifying substances of this invention was evaluated. The water purifying substance used in this study is designated as an experimental sample EX-12.

An comparative sample CS-11 was evaluated without use of the water purifying substance of this invention each time a prescribed time passed. The result of this experiment is shown in Table 6.

TABLE 6

| | Phosphoric Acid Concentration ($P_2O_5$ ppm) in Water Time Lapse | | | | | | | |
|---|---|---|---|---|---|---|---|---|
| | 0 hr | 4 hrs | 8 hrs | 1 day | 2 days | 7 days | 14 days | 28 days |
| EX-13 | 50.00 | 36.80 | 25.57 | 14.75 | 8.45 | 3.25 | 0.89 | 0.15 |
| CS-11 | 50.00 | 50.05 | 49.97 | 49.95 | 49.92 | 49.90 | 49.87 | 49.83 |

From the results shown in Table 6, it is evident that by using the water purifying substance produced in Embodiment 3 noted above, the phosphoric acid concentration in water could be remarkably reduced to 0.15 ppm. Therefore, the water purifying substance containing ferrous sulfate which is produced in Embodiment 3 noted above shows excellent ability to fix phosphoric acid in sludge. Accordingly, it is found that the water purifying substance of this invention used in the aforenoted Embodiment 3 has more excellent ability to fix phosphoric acid in comparison with the polyaluminum chloride-free and ferrous sulfate-free water purifying substance as produced in Embodiment 1 noted above and ferrous sulfate-free water purifying substance containing polyaluminum chloride as produced in Embodiment 2.

COMPARATIVE STUDY 7

Evaluation Of Phosphoric Acid Fixing Ability of Water Purifying Substance With Ferrous Sulfate In Sludge In this comparative experiment, a phosphoric acid solution was added to 200 ml to prepare sludge samples having the respective phosphoric acid concentration of 0.23 and 51.00 ppm. Then, 15 g of water purifying substance with ferrous sulfate produced in the form of porous sintered particles in Embodiment 3 noted above was scattered in 1 liter of phosphoric acid solution mixed with sludge. Each time a prescribed time passed, the phosphoric acid fixing ability of the water purifying substances was evaluated. In this study, the water purifying substances scattered in the solution is designated as experimental samples EX-14 and EX-15.

Comparative samples CS-12 and CS-13 were prepared from solutions having the phosphoric acid concentration of 0.28 and 51.40 ppm, respectively, and evaluated in their phosphoric acid fixing abilities each time a prescribed time passed. The results of this experiment is shown in Table 7 below.

TABLE 7

| | Phosphoric Acid Concentration ($P_2O_5$ ppm) in Water Time Lapse | | | | | | | |
|---|---|---|---|---|---|---|---|---|
| | 0 hr | 4 hrs | 1 day | 2 days | 5 days | 12 days | 19 days | 33 days |
| EX-14 | 0.23 | 0.17 | 0.17 | 0.15 | 0.07 | 0.04 | 0.03 | 0.03 |
| EX-15 | 51.00 | 45.20 | 36.70 | 24.63 | 14.00 | 11.68 | 4.73 | 0.11 |
| CS-12 | 0.28 | 0.28 | 0.30 | 0.28 | 0.26 | 0.25 | 0.23 | 0.24 |
| CS-13 | 51.40 | 51.10 | 50.87 | 50.98 | 50.97 | 50.83 | 50.87 | 50.89 |

From the results shown in Table 7, it is evident that by using the water purifying substance, the phosphoric acid concentrations in water could be remarkably reduced to 0.03 and 0.11 ppm, respectively. Therefore, the water purifying substance containing ferrous sulfate which is produced in Embodiment 3 noted above shows excellent ability to fix phosphoric acid in sludge.

EMBODIMENT 4

Production Of Water Purifying Substance With Aluminum Sulfate Having High Phosphoric Acid Fixing Ability A raw material was prepared by fully mixing 5 kg of soil (clay not containing allophane), 0.9 kg of water, aluminum sulfate of 10% by dry weight relative to the soil, and calcium hydroxide (binder) of 35% by weight relative to the aluminum sulfate. The mixture thus obtained was squeezed out through pores of 3.5 mm in diameter and sintered in an electric furnace at 500° C. for 15 minutes to form porous sintered particles (2 to 4 mm in average diameter and 15 to 20% in porosity). Then, the sintered particles were scattered in water to examine the adaptation to water. The study revealed that the sintered particles were not decomposed nor suspended in water at all.

The water purifying substance formed in sintered particles was investigated in its phosphoric acid fixing ability in the following method. First, 20 g of the water purifying substance was added into four vessels containing samples of 1 liter of water having the phosphoric acid concentrations of 0.1, 1, 10 and 100 ppm, respectively. Next, the vessels were shaken five times to stir the mixture contained therein, and then, kept in a state of rest to observe the phosphoric acid fixing ability of the water purifying substance of this invention each time a prescribed time passed. As comparative examples, 20 g of sand was used in place of the water purifying substance of this invention. These comparative examples were observed under the same condition as above. The results of the study are shown in Table 8 below.

TABLE 8

[Effect of purifying water containing phosphoric acid by adding water purifying substances of the invention]

| | Phosphoric Acid Concentration ($P_2O_5$ ppm) in Water Time Lapse | | | | | |
|---|---|---|---|---|---|---|
| | 0 hr | 1 hrs | 4 hrs | 8 hrs | 1 day | 2 days |
| CvS-1 | 0.14 | 0.14 | 0.13 | 0.15 | 0.14 | 0.13 |
| ExS-1 | 0.14 | 0.04 | 0.04 | 0.04 | 0.04 | 0.04 |
| CvS-2 | 1.02 | 1.02 | 1.01 | 1.03 | 1.01 | 1.00 |
| ExS-2 | 1.02 | 0.14 | 0.10 | 0.06 | 0.06 | 0.04 |
| CvS-3 | 9.90 | 9.90 | 10.00 | 9.85 | 9.84 | 9.80 |
| ExS-3 | 9.90 | 1.70 | 0.40 | 0.20 | 0.20 | 0.20 |
| CvS-4 | 100.00 | 100.00 | 100.00 | 99.90 | 99.85 | 99.78 |
| ExS-4 | 100.00 | 24.10 | 11.70 | 0.60 | 0.41 | 0.30 |

(REMARKS)
[Comparative Specimens] / [Experimental Specimens]
CvS-1: 0.14 ppm $H_3PO_4$ + Sand / ExS-1: 0.14 ppm $H_3PO_4$ + WPS
CvS-2: 1.02 ppm $H_3PO_4$ + Sand / ExS-2: 1.02 ppm $H_3PO_4$ + WPS
CvS-3: 9.90 ppm $H_3PO_4$ + Sand / ExS-3: 9.90 ppm $H_3PO_4$ + WPS
CvS-4: 100 ppm $H_3PO_4$ + Sand / ExS-4: 100 ppm $H_3PO_4$ + WPS
$H_3PO_4$ ... Phosphoric Acid Solution
WPS ... Water Purifying Substance of the invention

EMBODIMENT 5

Production Of Water Purifying Substance With Aluminum Hydroxide Having High Phosphoric Acid Fixing Ability A raw material was prepared by fully mixing 5 kg of volcanic ash soil containing allophane, 0.7 kg of water, and aluminum hydroxide of 10% by dry weight relative to the soil. The mixture thus obtained was squeezed out through pores of 3.5 mm in diameter and sintered in an electric furnace at 500° C. for 15 minutes to form porous sintered particles (2 nun to 4 nun in average diameter and 25% to 30% in porosity). Then, the sintered particles were scattered in water to study the adaptation to water. The study revealed that the sintered particles were not decomposed nor suspended in water at all.

The water purifying substance of the sintered particles was investigated in its phosphoric acid fixing ability in the same method as Embodiment 4 noted above. The results of the study are shown in Table 9 below.

EMBODIMENT 6

Production Of Water Purifying Substance With Aluminum Hydroxide And Ferrous Sulfate Having High Phosphoric Acid Fixing Ability A principal raw material was prepared by fully mixing 5 kg of soil (clay containing no allophane), 0.8 kg of water, ferrous sulfate of 5% by dry weight relative to the soil, aluminum hydroxide of 5% by dry weight relative to the soil, and calcium oxide (binder) of 0.2% by weight. The mixture thus obtained was squeezed out through pores of 3.5 mm in diameter and sintered in an electric furnace at 500° C. for 15 minutes to form porous sintered particles (2 to 4 mm in average diameter and 15% to 20% in porosity). Then, the sintered particles were scattered in water to examine the adaptation to water. The study revealed that the sintered particles were not decomposed nor suspended in water at all.

The water purifying substance of the sintered particles was investigated in its phosphoric acid fixing ability in the same method as Embodiment 4 noted above. The results of the study are shown in Table 10 below.

TABLE 9

[Effect of purifying water containing phosphoric acid by adding water purifying substances of the invention]

| | Phosphoric Acid Concentration ($P_2O_5$ ppm) in Water Time Lapse | | | | | |
|---|---|---|---|---|---|---|
| | 0 hr | 1 hrs | 4 hrs | 8 hrs | 1 day | 2 days |
| CvS-1 | 0.14 | 0.14 | 0.13 | 0.15 | 0.14 | 0.13 |
| ExS-1 | 0.14 | 0.06 | 0.05 | 0.05 | 0.04 | 0.04 |
| CvS-2 | 1.02 | 1.00 | 1.01 | 1.00 | 0.99 | 1.00 |
| ExS-2 | 1.02 | 0.24 | 0.18 | 0.11 | 0.06 | 0.04 |
| CvS-3 | 9.90 | 9.90 | 10.00 | 9.85 | 9.84 | 9.80 |
| ExS-3 | 9.90 | 5.50 | 3.40 | 1.20 | 0.40 | 0.20 |
| CvS-4 | 100.00 | 100.00 | 100.00 | 99.90 | 99.85 | 99.78 |
| ExS-4 | 100.00 | 54.10 | 31.70 | 10.45 | 2.41 | 0.30 |

(REMARKS)
[Comparative Specimens] / [Experimental Specimens]
CvS-1: 0.14 ppm $H_3PO_4$ + Sand / ExS-1: 0.14 ppm $H_3PO_4$ + WPS
CvS-2: 1.02 ppm $H_3PO_4$ + Sand / ExS-2: 1.02 ppm $H_3PO_4$ + WPS
CvS-3: 9.90 ppm $H_3PO_4$ + Sand / ExS-3: 9.90 ppm $H_3PO_4$ + WPS
CvS-4: 100 ppm $H_3PO_4$ + Sand / ExS-4: 100 ppm $H_3PO_4$ + WPS
$H_3PO_4$ ... Phosphoric Acid Solution
WPS ... Water Purifying Substance of the invention

TABLE 10

[Effect of purifying water containing phosphoric acid by adding water purifying substances of the invention]

| | Phosphoric Acid Concentration ($P_2O_5$ ppm) in Water Time Lapse | | | | | |
|---|---|---|---|---|---|---|
| | 0 hr | 1 hrs | 4 hrs | 8 hrs | 1 day | 2 days |
| CvS-1 | 0.14 | 0.14 | 0.13 | 0.15 | 0.14 | 0.13 |
| ExS-1 | 0.14 | 0.04 | 0.04 | 0.04 | 0.03 | 0.03 |
| CvS-2 | 1.02 | 1.00 | 1.01 | 1.00 | 0.99 | 1.00 |
| ExS-2 | 1.02 | 0.12 | 0.09 | 0.06 | 0.05 | 0.04 |
| CvS-3 | 9.90 | 9.90 | 10.00 | 9.85 | 9.84 | 9.80 |
| ExS-3 | 9.90 | 1.12 | 0.60 | 0.20 | 0.10 | 0.04 |
| CvS-4 | 100.00 | 100.00 | 100.00 | 99.90 | 99.85 | 99.78 |
| ExS-4 | 100.00 | 21.10 | 10.20 | 2.60 | 0.81 | 0.10 |

(REMARKS)

[Comparative Specimens]      [Experimental Specimens]

CvS-1: 0.14 ppm $H_3PO_4$ + Sand    /    ExS-1: 0.14 ppm $H_3PO_4$ + WPS
CvS-2: 1.02 ppm $H_3PO_4$ + Sand    /    ExS-2: 1.02 ppm $H_3PO_4$ + WPS
CvS-3: 9.90 ppm $H_3PO_4$ + Sand    /    ExS-3: 9.90 ppm $H_3PO_4$ + WPS
CvS-4: 100 ppm $H_3PO_4$ + Sand    /    ExS-4: 100 ppm $H_3PO_4$ + WPS
$H_3PO_4$ ... Phosphoric Acid Solution
WPS ... Water Purifying Substance of the invention

EMBODIMENT 7

Production Of Water Purifying Substance With Ferrous Sulfate And Aluminum Sulfate Having High Phosphoric Acid Fixing Ability A principal raw material was prepared by fully mixing 2 kg of ferrous sulfate, 0.9 kg of water, and 1.3 kg of calcium oxide (binder). The mixture thus obtained was squeezed out through pores of 3.5 mm in diameter and sintered in an electric furnace at 500° C. for 15 minutes to form porous sintered particles (2 to 4 mm in average diameter and 40% to 60% in porosity). Then, the sintered particles were scattered in water to study the adaptation to water. The study revealed that the sintered particles were not decomposed nor suspended in water at all.

The water purifying substance of the sintered particles was investigated in its phosphoric acid fixing ability in the same method as Embodiment 4 noted above. The results of the study are shown in Table 11 below.

TABLE 11

[Effect of purifying water containing phosphoric acid by adding water purifying substances of the invention]

| | Phosphoric Acid Concentration ($P_2O_5$ ppm) in Water Time Lapse | | | | | |
|---|---|---|---|---|---|---|
| | 0 hr | 1 hrs | 4 hrs | 8 hrs | 1 day | 2 days |
| CvS-1 | 0.14 | 0.14 | 0.13 | 0.15 | 0.14 | 0.13 |
| ExS-1 | 0.14 | 0.04 | 0.04 | 0.03 | 0.02 | 0.02 |
| CvS-2 | 1.02 | 1.00 | 1.01 | 1.00 | 0.99 | 1.00 |
| ExS-2 | 1.02 | 0.10 | 0.07 | 0.05 | 0.03 | 0.02 |
| CvS-3 | 9.90 | 9.90 | 10.00 | 9.85 | 9.84 | 9.80 |
| ExS-3 | 9.90 | 1.05 | 0.52 | 0.12 | 0.09 | 0.03 |
| CvS-4 | 100.00 | 100.00 | 100.00 | 99.90 | 99.85 | 99.78 |
| ExS-4 | 100.00 | 15.10 | 8.20 | 0.60 | 0.42 | 0.05 |

(REMARKS)

[Comparative Specimens]      [Experimental Specimens]

CvS-1: 0.14 ppm $H_3PO_4$ + Sand    /    ExS-1: 0.14 ppm $H_3PO_4$ + WPS
CvS-2: 1.02 ppm $H_3PO_4$ + Sand    /    ExS-2: 1.02 ppm $H_3PO_4$ + WPS
CvS-3: 9.90 ppm $H_3PO_4$ + Sand    /    ExS-3: 9.90 ppm $H_3PO_4$ + WPS
CvS-4: 100 ppm $H_3PO_4$ + Sand    /    ExS-4: 100 ppm $H_3PO_4$ + WPS
$H_3PO_4$ ... Phosphoric Acid Solution
WPS ... Water Purifying Substance of the invention As is apparent from the foregoing description, the present invention brings about the marked effects as follows:

(A) Even the water purifying substance produced by sintering soil containing silicon compounds, aluminum compounds, iron compounds and/or their chemical compositions can bring the ability to fix phosphoric acid into full play.

Accordingly, the water purifying substance of this invention can integrate the artificial purification system with the native purification system, so that nutritious water fortified with phosphoric acid and so on can be improved without using any conventional wastewater treatment apparatus being expensive and awkward to handle.

(B) The water purifying substance according to this invention serves as an excellent coagulant.

By scattering the water purifying substance around a lake or marsh in which nutritious sludge and the like are accumulated, suspension matters floating in the water can be effectively coagulated and precipitated. As a result, liquation or diffusion of phosphoric acid can be prevented.

(C) The water purifying substance produced sintering soil containing silicon compounds, aluminum compounds, iron compounds and/or their chemical compositions together with polyaluminum chloride can further enhance the coagulating effect thereof.

(D) The water purifying substance produced sintering soil containing silicon compounds, aluminum compounds, iron compounds and/or their chemical compositions together with ferrous sulfate can further enhance the phosphoric acid fixing effect thereof.

(E) According to the method of the present invention, porous sintered solid particles can readily be produced by sintering soil containing silicon, aluminum and iron compounds and/or their chemical compositions at 200° to 700° C.

The water purifying substance produced by the method of the present invention has large porosity, and therefore, is not decomposed nor suspended in water. Accordingly, only by scattering the water purifying substances of this invention around a lake, marsh or other watering places, phosphoric acid existing in sludge accumulated on the bottom can be securely captured in the water purifying substances for a long time.

As many apparently widely different embodiments of this invention may be made without departing from the spirit and scope thereof, it is to be understood that the invention is not limited to the specific embodiments thereof except as defined in the appended claims.

What is claimed is:

1. A method for producing a water purifying substance, which comprises adding an aluminum compound and/or an iron compound to a material consisting mainly of allophanes or a soil containing at least one oxide selected from silicon oxide, aluminum oxide and iron oxide with water to obtain a mixture, and sintering said mixture at 200° C. to 700° C. to form porous sintered particles having an average particle size of 1 mm to 20 mm.

2. The method according to claim 1, wherein said aluminum compound is polyaluminum chloride, aluminum sulfate or aluminum hydroxide.

3. The method according to claim 1, wherein said iron compound is ferrous sulfate.

* * * * *